United States Patent
Pal

(10) Patent No.: US 11,746,700 B2
(45) Date of Patent: Sep. 5, 2023

(54) THERMAL MANAGEMENT FOR A MOTOR FEEDER

(71) Applicant: Hamilton Sundstrand Corporation, Charlotte, NC (US)

(72) Inventor: Debabrata Pal, Hoffman Estates, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 317 days.

(21) Appl. No.: 17/102,771

(22) Filed: Nov. 24, 2020

(65) Prior Publication Data

US 2022/0162992 A1    May 26, 2022

(51) Int. Cl.
| | |
|---|---|
| *F02C 7/14* | (2006.01) |
| *F02C 7/16* | (2006.01) |
| *H01B 7/42* | (2006.01) |
| *H02K 9/19* | (2006.01) |

(52) U.S. Cl.
CPC .............. *F02C 7/14* (2013.01); *F02C 7/16* (2013.01); *H01B 7/423* (2013.01); *H02K 9/19* (2013.01); *F05D 2210/11* (2013.01); *F05D 2260/213* (2013.01); *F05D 2260/98* (2013.01)

(58) Field of Classification Search
CPC .. F02C 7/14; F02C 7/16; H01B 7/423; H02K 9/19; F05D 2210/11; F05D 2260/213; F05D 2260/98; H02G 3/03; B64D 33/08
See application file for complete search history.

(56) References Cited

U.S. PATENT DOCUMENTS

| | | | |
|---|---|---|---|
| 3,551,581 A * | 12/1970 | Goodman | H01B 7/425 174/15.7 |
| 4,310,718 A | 1/1982 | Eng | |
| 6,100,467 A | 8/2000 | Kroulik | |
| 9,097,134 B2 | 8/2015 | Ferch et al. | |
| 10,071,811 B2 | 9/2018 | Kupiszewski et al. | |
| 10,308,366 B2 | 6/2019 | Kupizsewski et al. | |
| 2009/0167078 A1 * | 7/2009 | Watanabe | H01B 7/16 307/10.1 |
| 2012/0098261 A1 * | 4/2012 | Rozman | F02N 11/006 290/31 |

FOREIGN PATENT DOCUMENTS

| | | |
|---|---|---|
| KR | 20060079149 A | 7/2006 |
| WO | 2015119791 A1 | 8/2015 |

OTHER PUBLICATIONS

European Search Report for European Application No. 21198988.4; dated Mar. 1, 2022; 8 pages.

* cited by examiner

*Primary Examiner* — Jacob M Amick
*Assistant Examiner* — Charles J Brauch
(74) *Attorney, Agent, or Firm* — CANTOR COLBURN LLP

(57) ABSTRACT

Provided are embodiments for a feeder cooling tube, a system and method for performing thermal management. Embodiments include a feeder cooling tube having an inner tube arranged to define a path to flow a fluid through a length of the inner tube, wherein the fluid is provided to remove heat, and an outer tube arranged to enclose the inner tube which defines an area. Embodiments also include one or more feeder cables arranged between the inner tube and the outer tube, and a plurality of cooling struts, wherein each cooling strut of the plurality of cooling struts extends from a surface of the inner tube to a surface of the outer tube.

17 Claims, 3 Drawing Sheets

THERMAL MANAGEMENT FOR A MOTOR FEEDER

STATEMENT OF FEDERAL SUPPORT

This invention was made with Government support under Contract Number 80AFRC19C0015 awarded by the National Aeronautics and Space Administration (NASA) and Department of Defense (DoD). The Government has certain rights in the invention.

BACKGROUND

The present invention relates to the field of thermal management, and more specifically, to a thermal management system and method for implementing thermal management of feeder cables.

Aircraft include a variety of equipment that perform various functions ranging from controlling flight operations to powering auxiliary equipment. For example, the aircraft includes an engine to convert fuel to provide thrust. In addition, the aircraft can also include electrical components such as an electric motor or generator. This equipment can generate heat and if the heat is not efficiently managed or removed, various failure modes may occur leading to electrical failures or mechanical failures. The breakdown of insulation can cause the short-circuiting of the wiring or the breakdown of lubricants can cause damage to the bearings or seals which can result to the damage of rotating parts.

BRIEF DESCRIPTION

According to an embodiment, a feeder cooling tube for thermal management is provided. The feeder cooling tube includes an inner tube arranged to define a path to flow a fluid through a length of the inner tube, wherein the fluid is provided to remove heat; an outer tube arranged to enclose the inner tube which defines an area. The feeder cooling tube also includes one or more feeder cables arranged between the inner tube and the outer tube; and a plurality of cooling struts, wherein each cooling strut of the plurality of cooling struts extends from a surface of the inner tube to a surface of the outer tube.

In addition to one or more of the features described herein, or as an alternative, further embodiments include a feeder cable that is arranged between a pair of cooling struts of the plurality of cooling struts, wherein the pair of cooling struts define a region to house a feeder cable of the one or more feeder cables.

In addition to one or more of the features described herein, or as an alternative, further embodiments include a feeder cable that includes a gap pad layer that is arranged on a surface of each of the feeder cable that encloses each of the feeder cables and provides a thermal interface between each of the feeder cables and the pair of cooling struts.

In addition to one or more of the features described herein, or as an alternative, further embodiments include a gap pad layer for each of the feeder cables that provides a thermal interface to thermally couple a portion of the inner tube and a portion of the outer tube.

In addition to one or more of the features described herein, or as an alternative, further embodiments include a heat shield, wherein the heat shield is arranged on an outer surface of the outer tube that is opposite the surface of the plurality of cooling struts.

In addition to one or more of the features described herein, or as an alternative, further embodiments include a feeder cable that is coupled to a low spool motor, wherein the fluid comprises oil that is used for a low spool motor.

In addition to one or more of the features described herein, or as an alternative, further embodiments include a plurality of cooling struts that are arranged at a 60 degree angle of a neighboring cooling strut.

According to another embodiment, a thermal management system is provided. The thermal management system includes equipment and a cooling system, wherein the equipment includes at least one of a motor or generator; an electrical system to provide power to operate the equipment; and an inner tube arranged to define a path to flow a fluid through a length of the inner tube, wherein the fluid is provided to remove heat. The thermal management system also includes an outer tube arranged to enclose the inner tube which defines an area; one or more feeder cables arranged between the inner tube and the outer tube; and a plurality of cooling struts, wherein each cooling strut of the plurality of cooling struts extends from a surface of the inner tube to a surface of the outer tube.

In addition to one or more of the features described herein, or as an alternative, further embodiments include a feeder cable that is arranged between a pair of cooling struts of the plurality of cooling struts, wherein the pair of cooling struts define a region to house a feeder cable of the one or more feeder cables.

In addition to one or more of the features described herein, or as an alternative, further embodiments include a feeder cable that includes a gap pad layer that is arranged on a surface of each of the feeder cable that encloses each of the feeder cables and provides a thermal interface between each of the feeder cables and the pair of cooling struts.

In addition to one or more of the features described herein, or as an alternative, further embodiments include a gap pad layer for each of the feeder cables that provides a thermal interface to thermally couple a portion of the inner tube and a portion of the outer tube.

In addition to one or more of the features described herein, or as an alternative, further embodiments include a heat shield, wherein the heat shield is arranged on an outer surface of the outer tube that is opposite the surface of the plurality of cooling struts.

In addition to one or more of the features described herein, or as an alternative, further embodiments include a low spool motor, where the fluid includes oil that is used for the low spool motor.

In addition to one or more of the features described herein, or as an alternative, further embodiments include a plurality of cooling struts that arranged at a 60 degree angle of a neighboring cooling strut.

According to another embodiment, a method for implementing thermal management is provided. The method includes arranging one or more feeder cables between an inner tube and an outer tube, wherein the inner tube defines a path for a fluid to flow through the inner tube, wherein the outer tube encloses the inner tube; and arranging a plurality of cooling struts between the inner tube and the outer tube. The method also includes transferring heat from the one or more feeder cables through each of the plurality of cooling struts and to the fluid flowing in the inner tube.

In addition to one or more of the features described herein, or as an alternative, further embodiments include arranging each feeder cable between a pair of cooling struts, wherein the pair of cooling struts defines a region to house a feeder cable of the one or more feeder cables.

In addition to one or more of the features described herein, or as an alternative, further embodiments include providing a gap pad layer on a surface of each of the feeder cables, wherein the gap pad layer encloses each of the feeder cables and provides a thermal interface between each of the feeder cables and the pair of cooling struts.

In addition to one or more of the features described herein, or as an alternative, further embodiments include a gap pad layer for each of the feeder cables that provides a thermal interface to thermally couple a portion of the inner tube and a portion of the outer tube.

In addition to one or more of the features described herein, or as an alternative, further embodiments include providing a heat shield, wherein the heat shield is arranged on an outer surface of the outer tube that is opposite the surface of the plurality of cooling struts.

In addition to one or more of the features described herein, or as an alternative, further embodiments include a feeder cable is coupled to a low spool motor, wherein the fluid includes oil that is used for a low spool motor.

The technical effects of embodiments of the present disclosure provide a thin and low weight compact feeder thermal management system. Also, the technical effects of embodiments provide a passive solution where no additional electrical power is needed to operate the thermal management system.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

Low spool motor is housed in a turbo fan engine tail cone of an aircraft. The low spool motor can be used for various functions including electrified aircraft propulsion. This can provide e-taxi, climb boost, core turning, snap acceleration and other transient modes to assist the turbofan engine operation. High current carrying feeder cables from low spool motor traverse through low spool turbine exhaust. Low spool gas exits at very high exhaust temperature. In some instances, the exhaust gas can exit as high a 600 C. If the excess heat is not removed from the cable and system, various failures can occur. For example, the insulation on the feeder cables may exceed their optimal range leading to shorting of the neighboring cables. In addition, if the operating temperature of the system is exceeded, the life of the device may be reduced. There may be a need to provide cooling to the feeder cables to maintain the integrity of the insulation of the feeder cables. In addition, there may be a need to improve the shielding and cooling of the feeder cables from the hot turbine exhaust.

Conventional systems use electric fan-based air cooling systems which can be very heavy and add additional weight/equipment to the system that may require additional maintenance. The techniques used herein enable the elimination of the additional electric fan while still providing cooling to the system. This results in the reduction in the complexity and weight of the cooling system. The techniques described herein leverages the oil flowing to the motor to conduct heat from the both the motor and feeder cables.

Figure 1:
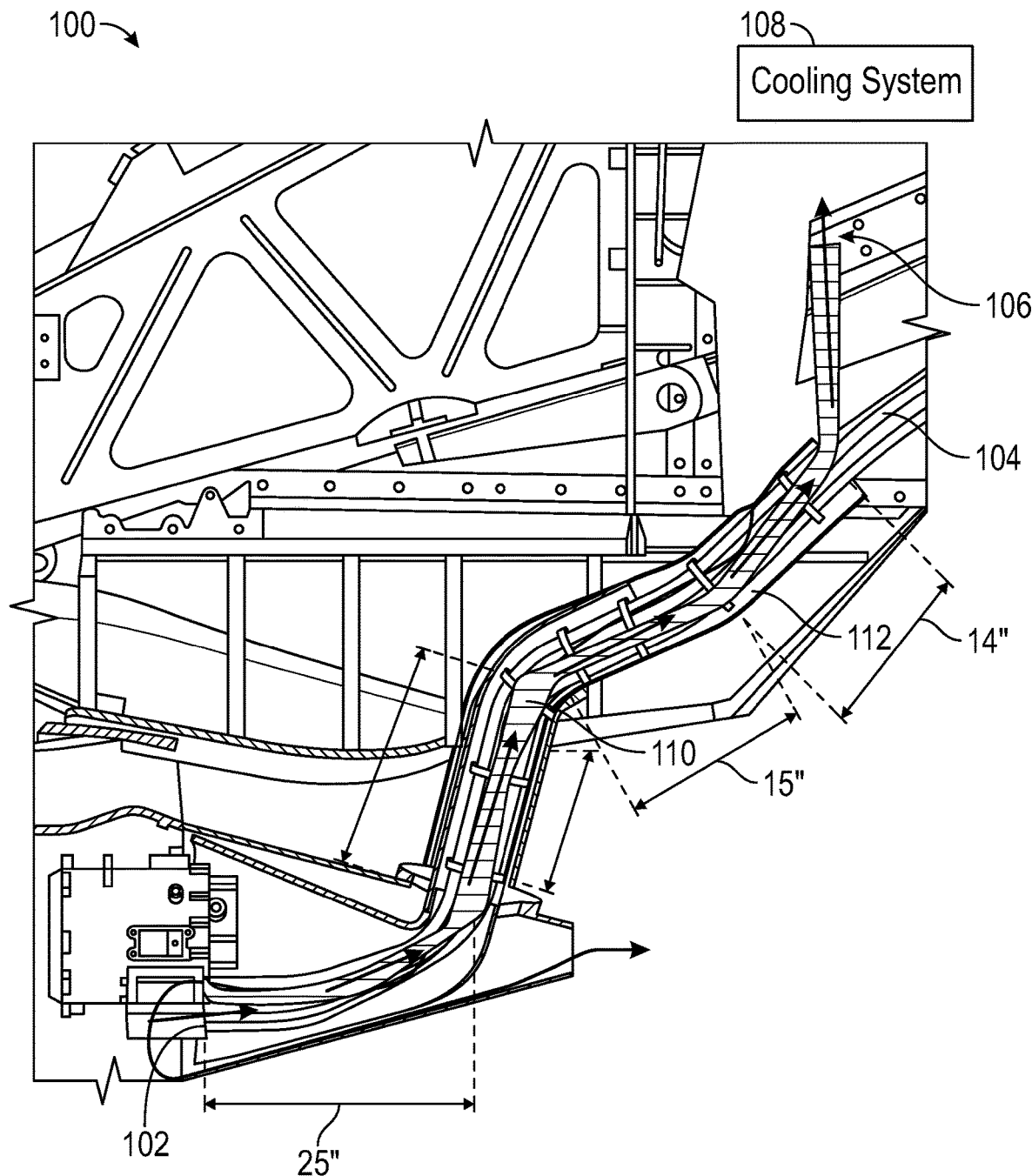
FIG. 1 illustrates a system for thermal management of feeder cables in accordance with one or more embodiments.

FIG. 1 depicts a thermal management system 100 (referred to as "system 100") for implementing thermal management in accordance with one or more embodiments. The system 100 can include a motor 102 that is electrically coupled to a plurality feeder cables 104. The motor 102 can be a low spool motor that uses oil 106 to cool and provide lubrication to the motor 102. The feeder cables 104 can be high-current carrying feeder cables 104. In addition, the system 100 can include an oil cooler 108 or oil cooling system to cool the oil 106 used for the motor 102. The oil cooler 108 can include any type of known heat reduction type of mechanism such as a heat exchanger. The oil 106 can be provided to the motor 102 through the inner tube 110. As shown in FIG. 1, the oil tube (inner tube 110) is thermally coupled to the feeder cables 104 that are housed in the outer tube 112. As the oil 106 is flowed to/from the motor 102 through the inner tube 110, the heat from the motor 102 and the feeder cable 104 is transferred to the oil 106 which carries the heat away from the motor 102 and feeder cables 104 to maintain the integrity of the equipment. In some embodiments, portions of the outer tube 112 can include a heat shield to further manage the heat generated in the system 100.

Figure 2:
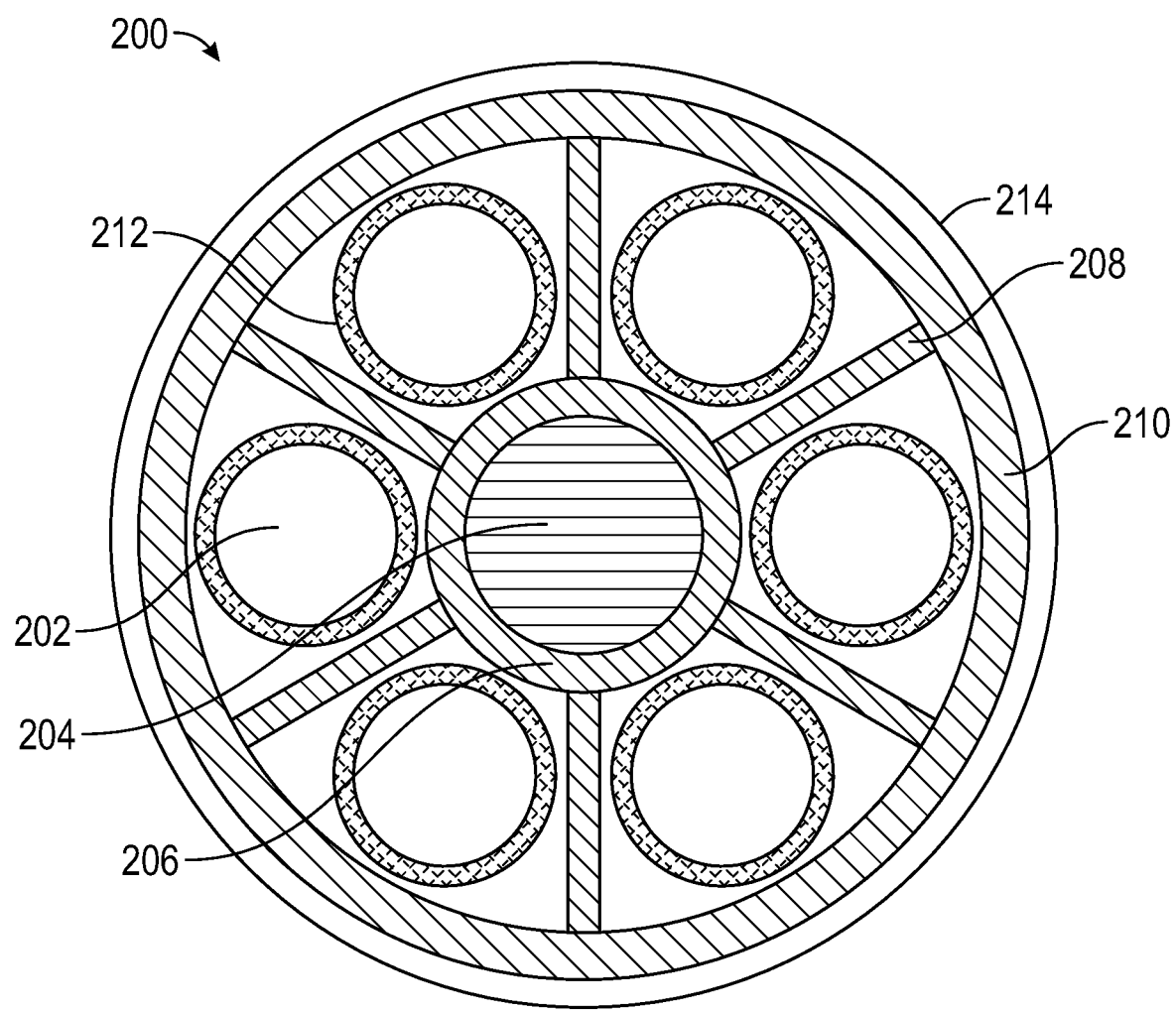
FIG. 2 depicts a cross-section of a feeder cooling tube used in the thermal management system of FIG. 1 in accordance with one or more embodiments.

Also, the motor 102 is not limited to the low spool motor of FIG. 2 but can also include any other type of 3-phase motor. In addition or alternatively to the motor 102, a generator (not shown) can be included in the system 100. such as but not limited to a permanent magnet generator, synchronous, or any other type of generator. Further details for the cooling system 100 is detailed with reference to FIG. 2.

Now referring to FIG. 2, a cross-section of the feeder cooling tube 200 that is implemented into the thermal management system 100 in accordance with one or more embodiments is shown. The cross-section of the feeder cooling tube 200 is shown in FIG. 2 is a fan-less arrangement which reduces the weight and complexity of the thermal management system 100.

The conduction cooled feeder cable 202 is used to carry power to/from a power source (not shown) to an electric equipment, such as the electric motor 102 shown in FIG. 1. It should be understood the feeder cooling tube 200 can be used to remove heat from high current carrying feeder cables used for different applications.

An inner tube 206 defines a tubular structure for transporting oil or other heat removing fluid to flow. The inner tube 206 may be referred to as an oil cooling tube at the center of the feeder cooling tube 200. The cooling tube may be made of any type of material that can conduct and transfer heat to the oil flowing in the inner tube 206.

In one or more embodiments, a plurality of cooling struts 208 can be used to separate each feeder cable 202 into a separate compartment. In addition, each cooling strut 208 can be made of a material that promotes the conduction of heat from the feeder cable 202 to the oil through the inner tube 206. The cooling struts 208 originate at the inner tube 206 and extend to the outer tube 210. The cooling struts 208 provide a thermal interface and direct path to remove heat from the feeder cables 202. In one or more embodiments, the feeder cables 202 are housed in the space between two cooling struts 208.

In some embodiments, the feeder cable 202 can be enclosed in a thermally conductive pliable gap pad layer 212. For example, the gap pad layer 212 can be arranged on an outer surface of each of the feeder cables 202 as shown in FIG. 2. The gap pad layer 212 can be positioned such that each of the gap pad layers 212 contacts a pair of cooling struts 208 where the cooling struts 208 are adjacent to one another. This can improve the conduction of heat away from feed cables 202 by providing a direct path for the heat to be transferred to the oil. A heat shield layer 214 is provided adjacent to the heat shield layer 214 prevents incident radiative heat from the turbine exhaust housing to the feeder cable system.

In some embodiments, the heat is conducted from the feeder cable 202 through its shielding and insulation layers to the gap pad layer 212 and then to the struts and the oil cooling tube. It should be understood the arrangement of feeder cooling tube 200 is not limited by feeder cooling tube 200 shown in FIG. 2. The cooling struts 208 and inner tube 206 can be made of high thermal conductivity type material.

Figure 3:
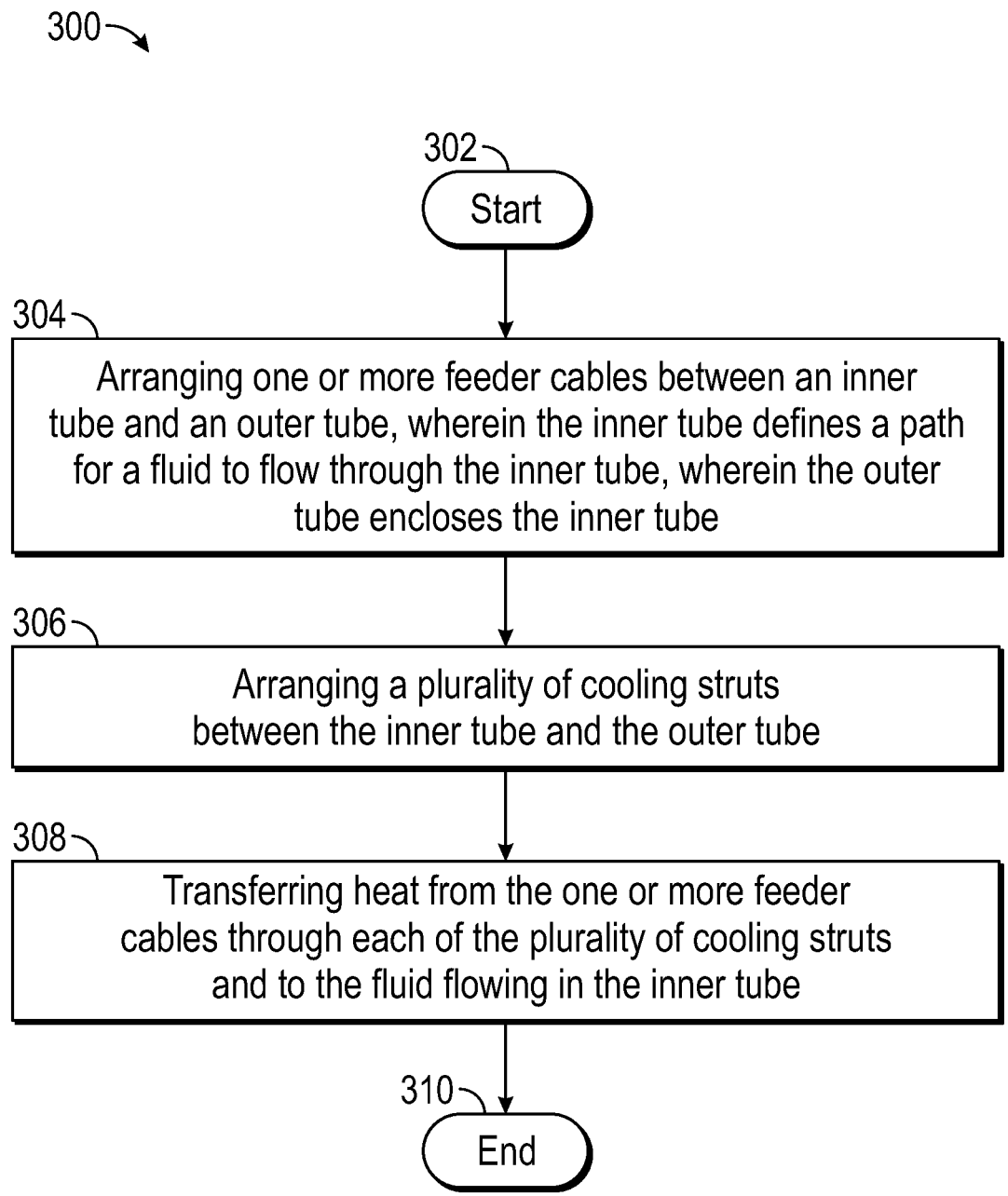
FIG. 3 depicts a flowchart of the method for implementing a thermal management of feeder cables in accordance with one or more embodiments.

FIG. 3 depicts a flowchart of a method 300 for implementing a thermal management system such as that shown in FIG. 1. The method 300 can be performed by the system 100 shown in FIG. 1. The method 300 begins at block 302 and continues to block 304 which provides arranging one or more feeder cables 202 between an inner tube 206 and an outer tube 210, wherein the inner tube 206 defines a path for a fluid to flow through the inner tube 206, wherein the outer tube 210 encloses the inner tube 206. Block 306 arranges a plurality of cooling struts 208 between the inner tube 206 and the outer tube 210.

Block 308 transfers heat from the one or more feeder cables 202 through each of the plurality of cooling struts 208 and to the fluid flowing in the inner tube 206. The method 300 ends at block 310. It should be understood the method 300 is not intended to be limited by that shown in FIG. 3 but can include different steps, additional steps, or a different sequence of steps.

The technical effects and benefits include eliminating the electrical fan and reducing the complexity of the cooling system for the feeder cables. The technical effects and benefits provide a thin and low weight compact feeder thermal management. It is completely passive, and no additional electrical power is needed to operate this system.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A feeder cooling tube for thermal management, further comprising:
   an inner tube arranged to define a path to flow a fluid through a length of the inner tube, wherein the fluid is provided to remove heat;
   an outer tube arranged to enclose the inner tube which defines an area;
   one or more feeder cables arranged between the inner tube and the outer tube; and
   a plurality of cooling struts, wherein each cooling strut of the plurality of cooling struts extends from a surface of the inner tube to a surface of the outer tube;
   wherein the feeder cable is coupled to a low spool motor, wherein the fluid comprises oil that is used for a low spool motor.

2. The structure of claim 1, wherein each feeder cable is arranged between a pair of cooling struts of the plurality of cooling struts, wherein the pair of cooling struts define a region to house a feeder cable of the one or more feeder cables.

3. The structure of claim 2, wherein each feeder cable comprises a gap pad layer that is arranged on a surface of each of the feeder cable that encloses each of the feeder cables and provides a thermal interface between each of the feeder cables and the pair of cooling struts.

4. The structure of claim 3, wherein the gap pad layer of each of the feeder cables provides a thermal interface to thermally couple a portion of the inner tube and a portion of the outer tube.

5. The structure of claim 1, further comprising a heat shield, wherein the heat shield is arranged on an outer surface of the outer tube that is opposite the surface of the plurality of cooling struts.

6. The structure of claim 1, wherein each of the plurality of cooling struts are arranged at a 60 degree angle of a neighboring cooling strut.

7. A thermal management system comprising:
   equipment and a cooling system, wherein the equipment comprises at least one of a motor or generator;
   an electrical system to provide power to operate the equipment;
   an inner tube arranged to define a path to flow a fluid through a length of the inner tube, wherein the fluid is provided to remove heat;
   an outer tube arranged to enclose the inner tube which defines an area;
   one or more feeder cables arranged between the inner tube and the outer tube; and a plurality of cooling struts, wherein each cooling strut of the plurality of cooling struts extends from a surface of the inner tube to a surface of the outer tube;

wherein the equipment is a low spool motor, where the fluid comprises oil that is used for the low spool motor.

8. The system of claim 7, wherein each feeder cable is arranged between a pair of cooling struts of the plurality of cooling struts, wherein the pair of cooling struts define a region to house a feeder cable of the one or more feeder cables.

9. The system of claim 8, wherein each feeder cable comprises a gap pad layer that is arranged on a surface of each of the feeder cable that encloses each of the feeder cables and provides a thermal interface between each of the feeder cables and the pair of cooling struts.

10. The system of claim 9, wherein the gap pad layer of each of the feeder cables provides a thermal interface to thermally couple a portion of the inner tube and a portion of the outer tube.

11. The system of claim 7, further comprising a heat shield, wherein the heat shield is arranged on an outer surface of the outer tube that is opposite the surface of the plurality of cooling struts.

12. The system of claim 7, wherein each of the plurality of cooling struts are arranged at a 60 degree angle of a neighboring cooling strut.

13. A method for implementing thermal management further comprising:

arranging one or more feeder cables between an inner tube and an outer tube, wherein the inner tube defines a path for a fluid to flow through the inner tube, wherein the outer tube encloses the inner tube;

arranging a plurality of cooling struts between the inner tube and the outer tube; and transferring heat from the one or more feeder cables through each of the plurality of cooling struts and to the fluid flowing in the inner tube;

wherein the feeder cable is coupled to a low spool motor, wherein the fluid comprises oil that is used for a low spool motor.

14. The method of claim 13, further comprising arranging each feeder cable between a pair of cooling struts, wherein the pair of cooling struts defines a region to house a feeder cable of the one or more feeder cables.

15. The method of claim 14, further comprising providing a gap pad layer on a surface of each of the feeder cables, wherein the gap pad layer encloses each of the feeder cables and provides a thermal interface between each of the feeder cables and the pair of cooling struts.

16. The method of claim 15, wherein the gap pad layer of each of the feeder cables provides a thermal interface to thermally couple a portion of the inner tube and a portion of the outer tube.

17. The method of claim 13, further providing a heat shield, wherein the heat shield is arranged on an outer surface of the outer tube that is opposite the surface of the plurality of cooling struts.

* * * * *